Sept. 3, 1968 C. E. FRICK 3,399,837
FOAM SPRAY GUN HAVING REPLACEABLE NOZZLE
Filed Aug. 14, 1964 3 Sheets-Sheet 1

INVENTOR
CHARLES E. FRICK
BY Irwin A. Lavine
ATTORNEY

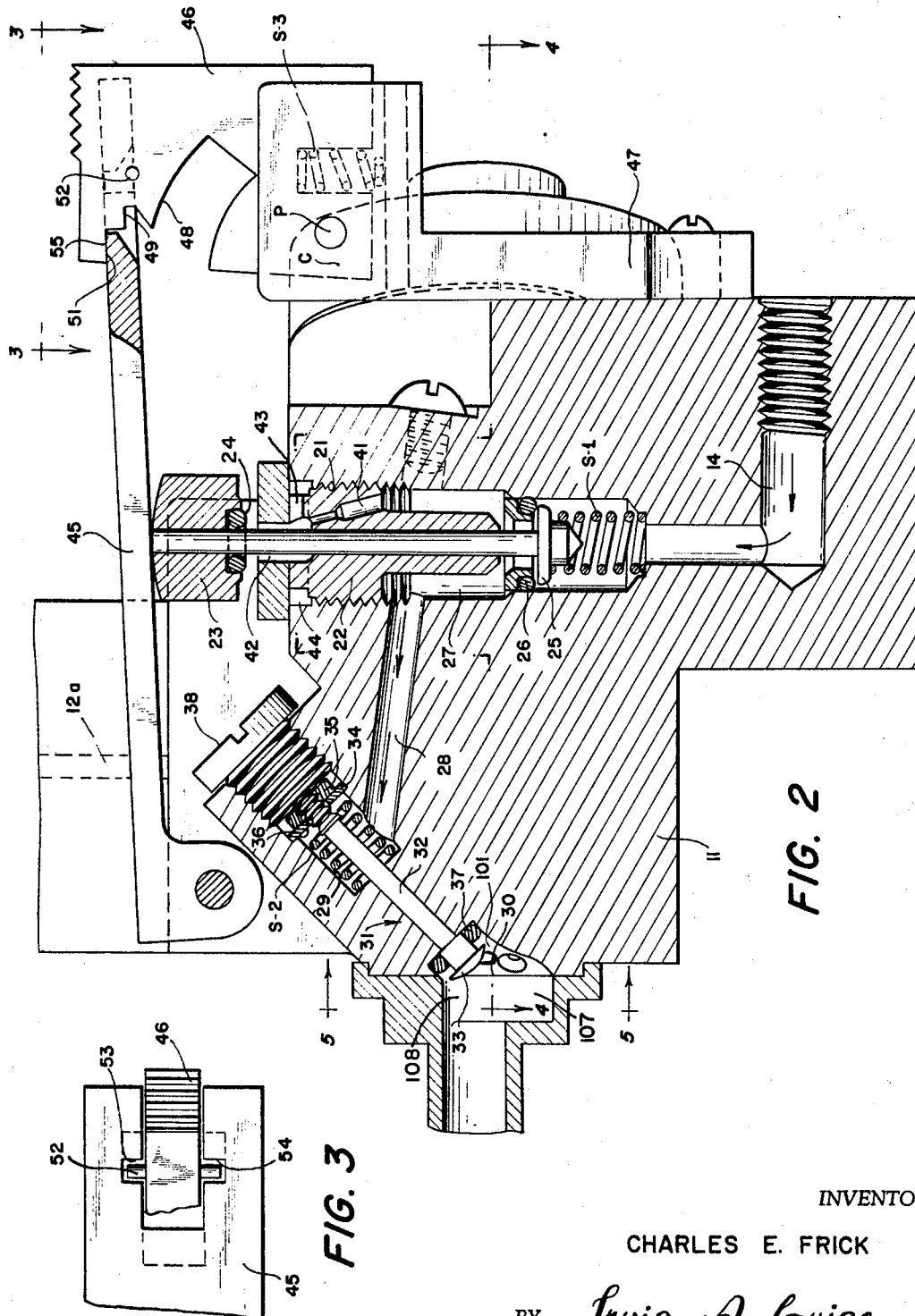

Sept. 3, 1968  C. E. FRICK  3,399,837
FOAM SPRAY GUN HAVING REPLACEABLE NOZZLE
Filed Aug. 14, 1964  3 Sheets-Sheet 3
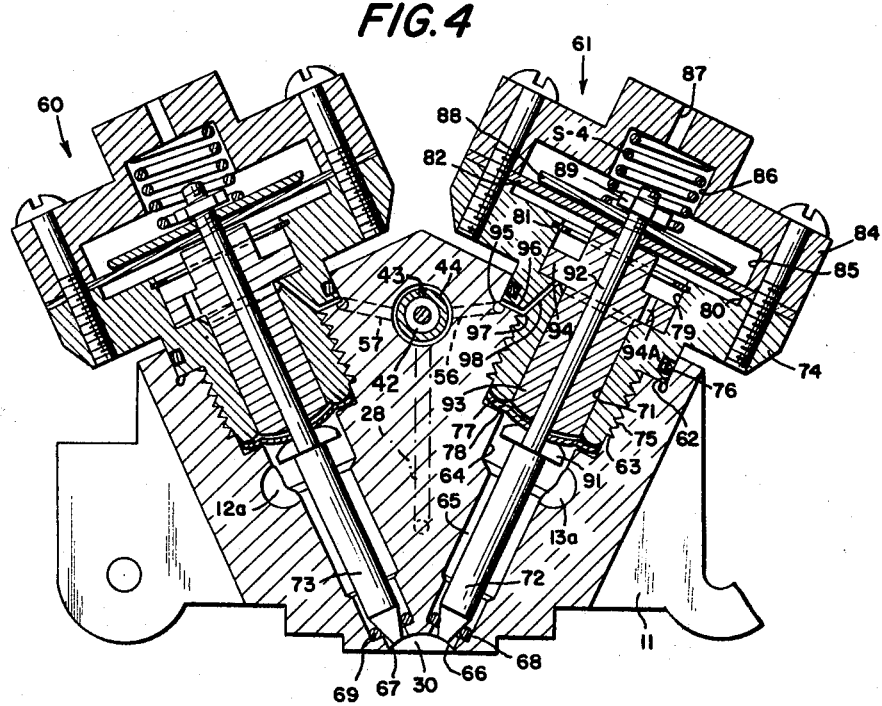
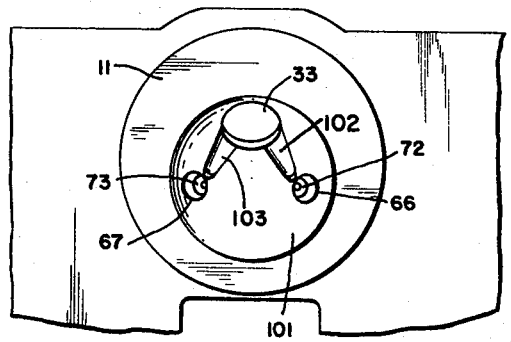
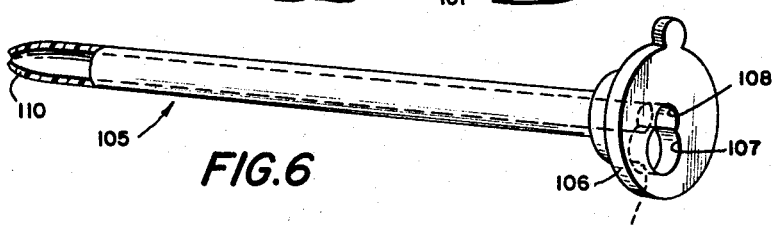
INVENTOR
CHARLES E. FRICK
BY *Irvin A. Lavine*
ATTORNEY United States Patent Office 3,399,837
Patented Sept. 3, 1968

3,399,837
FOAM SPRAY GUN HAVING
REPLACEABLE NOZZLE
Charles E. Frick, South Charleston, W. Va., assignor to Union Carbide Corporation, a corporation of New York
Filed Aug. 14, 1964, Ser. No. 389,539
30 Claims. (Cl. 239—415)

The present invention relates to a foam spray gun, and more particularly to a foam spray gun having a mixing chamber with liquid inlet passages cleaned by the mixing air, with a toggle arrangement for holding a nozzle on the spray gun body, and having a disposable nozzle having a portion of the mixing chamber therein.

It is desirable to spray plastic materials which when mixed together and with air form a plastic cellular body known as foam. Typically, polyurethane foams may be made from polyurethane forming ingredients, such as a resin and an isocyanate. One or both of these materials, when exposed to air, tend to harden, and thus difficulty has been encountered in past foam spray gun constructions in that the material has hardened in the gun itself. Consequently, after use, it was necessary to spend a great deal of time and effort to clean the foam spray gun.

It is an object of the present invention to provide a foam spray gun which will eliminate or substantially reduce the necessity for cleaning after use.

It is another object of the present invention to provide a foam spray gun having as a part thereof a disposable nozzle.

Another object of the present invention is the provision of a foam spray gun nozzle which is so economical as to be disposable.

A further object of the present invention is to provide a foam spray gun in which a disposable nozzle includes a portion of a mixing chamber.

A further object of the present invention is to provide a foam spray gun in which liquid inlet ports to a mixing chamber are swept clean after the flow of liquid through the ports has been stopped.
chamber are swept clean after the flow of liquid through the ports has been stopped.

Yet another object of the present invention is the provision of a foam spray gun assembly having means for readily removing and replacing a nozzle thereof.

Another object of the present invention is the provision of a foam spray gun in which liquid is prevented from entering the air passages.

A further object of the present invention is to provide an air operated valve for use with a spray gun which permits control of liquid flow and separation of liquid and air.

Other objects and many of the attendant advantages of the present invention will be readily understood from the following specification and drawings wherein:

FIG. 2 is a cross-sectional view taken on the line 2—2 of FIG. 1.

FIG. 3 is a view taken on the line 3—3 of FIG. 2.

FIG. 4 is a cross-sectional view taken on the line 4—4 of FIG. 2.

FIG. 5 is a view taken on the line 5—5 of FIG. 2.

FIG. 6 is a perspective view of a nozzle.

Figure 1:
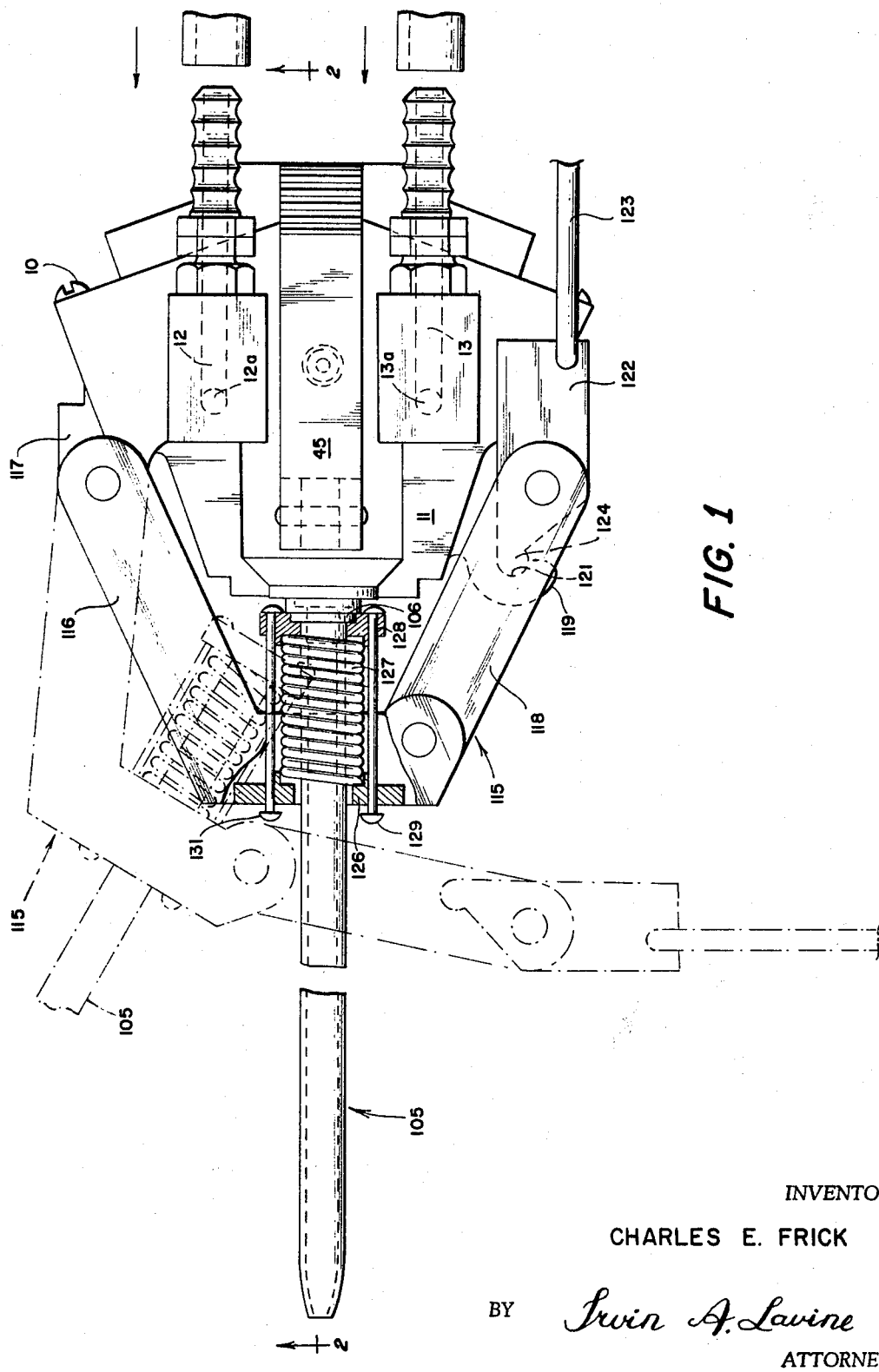
FIG. 1 is a plan view of a foam spray gun in accordance with the present invention.

Referring now to the drawings, wherein like or corresponding reference numerals are used to designate like or corresponding parts throughout the several views, there is shown in FIG. 1 a spray gun generally designated 10 and comprising a body 11. Foam forming liquids are introduced into the body 11 through liquid passages 12, 12a and 13, 13a and air under pressure is introduced into the body through air inlet passage 14 (FIG. 2).

The air inlet passage 14 communicates with a bore 21 in which is positioned an air control valve 22 which may be seen to have a stem head 23 by which the air control valve 22 may be opened. Stem head 23 carries a resilient O-ring 24 and moves a valve head 25 away from a seat 26, against the force of a spring S–1 to permit air under pressure to flow past the valve head 25 and into a chamber 27 around the body of valve 22. The air then flows through connecting passage 28 to a mixing chamber air supply passage 29, which leads to a mixing chamber 30.

The flow of air through passage 29 into mixing chamber 30 is controlled by a poppet valve 31 having a stem 32 of triangular shape in cross section and an enlarged head 33; a washer 34 secured by a nut 35 to stem 32 serves as an abutment for spring S–2 and cooperates with shoulder 36 to limit opening movement of valve 31. Head 33 seats against a resilient O-ring 37, and also serves as an air deflector in the open position. Passage 29 is closed by a plug 38.

Air is also led from chamber 27 by a passage 41 in valve 22 to a chamber 42 in the upper part of the valve 22 which is shown to be open to the atmosphere; a lateral passage 43 connects chamber 42 to an annular chamber 44, which connects with air-operated liquid control valves.

A trigger 45 is pivoted to the body 11, and extends rearwardly over and past the stem head 23 of air control valve 22, where it cooperates with a holding plate 46 pivotally supported by pin P on a bracket 47 attached by screws to the rear of body 11. A spring S–3 urges holding plate 46 in a counter clockwise direction as seen in FIG. 2. Holding plate 46 has an arcuate notch 48 concentric with center C, and notches 49 and 51, as well as a transverse pin 52. Trigger 45, as seen in FIG. 3, is bifurcated at the rear thereof, and two notches 53 and 54 to cooperate with pin 52. It also has a clamping surface 55.

In operation, the stem of control valve 22 is actuated by trigger 45. Trigger 45 is retained in the release position by engagement of clamping surface 55 with notch 51 of holding plate 46. To commence spraying, trigger 45 is depressed, allowing clamping surface 55 to contact arcuate notch 48. This causes the valve head 25 to be spaced from seat 26, and forces O-ring 24 to close the end of chamber 42. Therefore, air may not escape to atmosphere through chamber 42, and proceeds to cavity 30 via valve 31, and to chamber 44; and from the latter to liquid control valves. The eccentricity of notch 48 relative to pin P compensates for wear and possible misalignment of parts, eliminating the need for close mechanical tolerances. To cease spraying, holding plate 46 is rotated clockwise permitting clamping surface 55 to disengage notch 48. This permits trigger 45 to rise until it strikes pin 52. At this position, valve head 25 is open, and O-ring 24 has risen to vent chamber 42, and consequently chamber 44. Air continues to flow through valve 31 to cavity 30. When finger pressure is removed from holding plate 46, pin 52 passes through notches 53 and 54, allowing clamping surface 55 to engage notch 49, air continuing to flow to chamber 30. Upon again depressing plate 46, clamping surface 55 returns to notch 51, and the flow of air is stopped at valve head 25.

Referring now to FIG. 4, the body 11 is shown, together with a pair of air-controlled liquid control valves 60 and 61, of identical construction; both are operated by means of air supplied from chamber 44 through passages 56 and 57, and each controls liquid supplied through passages 12a and 13a, respectively. The body 11 has stepped bores 62, 63, 64 and 65. Bore 63 is threaded, and bore 65 terminates in a port 66. A similar port 67 is provided for the bore of valve 60, and both ports serve as liquid inlet ports 66 and 67 for mixing chamber 30. Resilient O-rings 68 and 69 are provided at the ports 66 and 67, and are engaged by the ends of stems 72 and 73.

Valve 61 has a lower body 74 with threads 75 engaging the threaded bore 63. An O-ring 76 sealingly engages bore 62, and a shoulder 77 presses a Teflon diaphragm 78 against a shoulder between bores 63 and 64. Body 74 is provided with a small bore 71, an intermediate bore 79 and a larger bore 80, bore 79 having a snap ring 81 therein. Clamped between lower body 74 and upper body 84 is a diaphragm 82. Upper body 84 is provided with a bore 85, a smaller bore 86, and a vent 87. A pressure plate 88 is secured to stem 72 by a nut 89, and is acted on by a spring S-4 in the bores 86 and 85.

Diaphragm 78 is clamped between a collar 91 soldered to stem 72 and a spacer 92 which has a lower part 93 slidable in bore 71 and an enlarged head 94 which is slidable in bore 79. Head 94 is provided with a port 94a. Spacer 92 at its upper end clamps diaphragm 82 against pressure plate 88.

Passage 56 connects with an annular recess 95, a radial passage 96, and another annular recess 97. A passage 98 through body 74 leads to the underside of enlarged head 94.

In operation spring S-4 holds the stem 72 against O-ring 68, preventing flow of liquid from passage 13a through port 66. When air is supplied to chamber 44, it passes to the underside of head 94, through port 94a to the underside of diaphragm 82. Since this diaphragm is larger than diaphragm 78, the force of spring S-4 is overcome, and stem 72 is moved away from O-ring 68, permitting liquid to flow into chamber 30; the opening movement of stem 72 is limited by snap ring 81. Thus, the liquid is maintained separate from the operating air, and will not solidify in the valve.

Referring now to FIG. 5, there is shown a cavity 101 in body 11, cavity 101 being generally part-spherical in shape. Head 33 of valve 31 may be seen therein, slightly above the middle, and liquid ports 66 and 67, with the valve stems 72 and 73 slightly below the middle. A pair of shallow channels 102 and 103 extend from the air inlet port defined by O-ring 37 to the liquid inlet ports 66 and 67 and serve, together with the deflector head 33, to conduct air to and past the ports. When liquid ports 66 and 67 are open, liquid and air mixing is enhanced. Since the liquid ports are closed by valves 60 and 61 prior to the closing of air valve 31, air will sweep all liquid from cavity 101, and from liquid ports 66 and 67, thus automatically cleaning them and preventing solidification of liquid in the body 11.

In FIG. 6, the nozzle generally designated 105 is generally longitudinally extending, and has a flange 106 at the inlet end thereof. A generally cylindrical chamber 107 is provided adjacent the inlet end of nozzle passage 108, the axis of chamber 107 being parallel to the axis of passage 108, these axes being spaced apart slightly greater than the diameter of the nozzle passage 108 at its inlet end. The diameter of the cylindrical chamber 107 is approximately equal to the spacing of these axes. In one practical embodiment, the nozzle passage 108 at its inlet end has a diameter of ¼ inch, the cylindrical chamber 107 has a (nominal) diameter of 5/16 inch, and the spacing of the axes is approximately 5/16 inch. Nozzle 105 is 5 inches long, and nozzle passage 108 is 3/16 inch at its discharge end 110, tapering to that diameter from a point ½ inch upstream from the discharge end.

The cylindrical chamber 107 is characterized by relatively sharp corners at the intersection of the face 109 of chamber 107 and the cylindrical surface of chamber 107.

The opening formed by the inlet end of passage 108 and chamber 107, transverse to the axial direction of the chamber 107 and passage 108, is substantially equal to the span of the part-spherical cavity 101 in body 11, and as may be seen in FIG. 2, the inlet of nozzle passage 108 and of chamber 107 are in confronting relationship to the part-spherical cavity 101, these parts thereby forming the mixing chamber 30 for the materials to be sprayed, and the air.

The nozzle 105 is of polyethylene, and is thereby disposable.

A pivoted link mechanism, see FIG. 1, generally designated 115 is utilized to permit ready replacement of the spray nozzle 105, and includes a first link 116 pivoted at one end to an ear 117 of the spray gun body 11, link 116 being angled and extending in front of cavity 101. A second link 118 is pivotally connected to the end of link 116, and extends towards and beside the opposite side of the body 11, where a second ear 119 extends outwardly therefrom. Ear 119 is provided with a notch 121, and a third link 122 pivotally connected at the end of second link 118 is provided with a handle 123 and a latch 124 which is engageable with the notch 121, in an over-center relationship relative to the two pivot points of link 118.

A collar 126 is carried by the link 116 where it extends in front of the cavity 101, this collar having a coil spring 127 abutting it, with a second collar 128 abutting the other end of coil spring 127. Headed pins 129, 131 hold collars 126 and 128, and spring 127, in loosely assembled relationship. The two collars 126 and 128 and coil spring 127 are in axial alignment, and the second collar 128 bears against the flange 106 of nozzle 105, to thereby hold the nozzle 105 in position against body 11, spring 127 also functioning to provide a bias on the latch 124.

In summary, movement of trigger 45 will open air control valve 22 to permit air to enter the mixing chamber 30 after opening the air poppet and distributing valve 31. Air flowing past the air control valve 22 will also actuate and open the liquid valves 60 and 61 to admit liquid through the liquid ports 66 and 67, the three fluids mixing in a turbulent fashion in the mixing chamber formed by the cavity 101 and the chamber 107 and the inlet end of nozzle passage 108. Because of the sharp angles in the mixing chamber 107, in addition to the general configuration of the mixing chamber, the materials, including the compressed air, will be thoroughly mixed, and the liquid-air mix will be forced out of the nozzle 105, traversing the axial bore of passage 108 and the tapered end portion of decreasing diameter. Some air entering chamber 30 will traverse it with little or no turbulence, it is believed, assisting in forcing the mixture along passage 108. When the trigger 45 is relieved, O-ring 24 will vent chamber 42, and as a consequence the air operated liquid valves 60 and 61 will immediately close, and thereafter air will continue to rush past the air distributor valve 31, sweeping the surface of cavity 101 and the ends of the stems 72 and 73 and the liquid ports 66 and 67. By this operation, the above mentioned surfaces are maintained in a clean state, without a deposit of material thereon which would tend to clog or otherwise interfere with the operation of the foam spray gun 10. Further, valve 31 will close if for any reason pressure in the chamber 30 begins to build up, so as to prevent entry of any liquid to or past O-ring 37.

When it is necessary to change the nozzle 45, it is only necessary to manipulate the handle 63 to swing open the pivoted link mechanism 115, after which the nozzle 105 may be readily removed and a new nozzle 105 replaced in its stead.

It will be obvious to those skilled in the art that various changes may be made without departing from the spirit of the invention and therefore the invention is not limited to what is shown in the drawings and described in the specification but only as indicated in the appended claims.

What is claimed is:

1. In a spray gun, means defining a generally part-spherical cavity, an air inlet port in said cavity defining means centrally located above the middle thereof, a pair of liquid inlet ports located laterally of said air inlet port and below the middle of said cavity defining means, a shallow groove in said cavity defining means extending from said air inlet port to each of said liquid inlet ports, a liquid inlet passage leading to each of said liquid inlet ports, a liquid valve in each said liquid inlet passage seating at a said liquid inlet port, an air inlet passage leading to said air inlet port, an air distributor valve having a stem in said air inlet passage and an enlarged distributor head in said cavity defining means, spring means urging said air distributor valve head to closed position against said air inlet port, a nozzle having a nozzle passage therethrough and a chamber adjacent the inlet end of said passage having an opening adjacent the passage inlet end, means communicating said chamber and said passage substantially at the inlet end of said passage, said nozzle passage inlet end and chamber being in confronting relation to said cavity defining means and forming therewith a mixing chamber, said nozzle passage being substantially in line with said air inlet port, said nozzle having a flange at the inlet end thereof seating against said spray gun in surrounding relationship to said cavity defining means, and means for holding said nozzle against said spray gun.

2. In a spray gun, means defining a cavity, an air inlet port in said cavity defining means, an air inlet passage leading to said air inlet port, an air distributor valve having a stem in said air inlet passage and an enlarged distributor head in said cavity defining means, spring means urging said air distributor valve head to closed position against said air inlet port, a pair of liquid inlet ports spaced from said air inlet port in said cavity defining means, a liquid inlet passage leading to each of said liquid inlet ports, a liquid valve in each said liquid inlet passage seating at a said liquid inlet port, a shallow groove in said cavity defining means extending from said air inlet port to each of said liquid inlet ports, a nozzle having a nozzle passage therethrough and a chamber adjacent the inlet end of said passage having an opening adjacent the passage inlet end, means communicating said chamber and said passage substantially at the inlet end of said passage, said nozzle passage inlet end and said chamber being in confronting relation to said cavity defining means and forming a mixing chamber therewith, said nozzle passage being substantially in line with said air inlet port.

3. In a spray gun, means defining a cavity, an air inlet port in said cavity defining means, an air inlet passage leading to said air inlet port, an air distributor valve having an enlarged distributor head in said cavity defining means, spring means urging said air distributor valve head to closed position against said air inlet port, a pair of liquid inlet ports spaced from said air inlet port in said cavity defining means, a liquid inlet passage leading to each of said liquid inlet ports, a liquid valve in each said liquid inlet passage seating at a said liquid inlet port, a shallow groove in said cavity defining means extending from said air inlet port to each of said liquid inlet ports, a nozzle having a nozzle passage therethrough and a chamber adjacent the inlet end of said passage having an opening adjacent the passage inlet end, means communicating said chamber and said passage substantially at the inlet end of said passage, nozzle passage inlet end and said chamber being in confronting relation to said cavity defining means and forming a mixing chamber therewith, said nozzle passage being substantially in line with said air inlet port.

4. In a spray gun, means defining a cavity, an air inlet port in said cavity defining means, an air inlet passage leading to said air inlet port, an air distributor valve having an enlarged distributor head in said cavity defining means, spring means urging said air distributor valve head to closed position against said air inlet port, a pair of liquid inlet ports spaced from said air inlet port in said cavity defining means, a liquid inlet passage leading to each of said liquid inlet ports, a liquid valve in each said liquid inlet passage seating at a said liquid inlet port, a nozzle having a nozzle passage therethrough and a chamber adjacent the inlet end of said passage having an opening adjacent the passage inlet end, means communicating said chamber and said passage substantially at the inlet end of said passage, said nozzle passage inlet end and said chamber being in confronting relation to said cavity defining means and forming a mixing chamber therewith, said nozzle passage being substantially in line with said air inlet port.

5. In a spray gun, means defining a cavity, an air inlet port in said cavity defining means, an air inlet passage leading to said air inlet port, an air distributor valve having an enlarged distributor head in said cavity defining means, spring means urging said air distributor valve head to closed position against said air inlet port, a pair of liquid inlet ports spaced from said air inlet port in said cavity defining means, a liquid inlet passage leading to each of said liquid inlet ports, a liquid valve in each said liquid inlet passage seating at a said liquid inlet port, a nozzle having a nozzle passage therethrough and a chamber adjacent the inlet end of said passage having an opening adjacent the passage inlet end, means communicating said chamber and said passage substantially at the inlet end of said passage, said nozzle passage inlet end and said chamber being in confronting relation to said cavity defining means and forming a mixing chamber therewith.

6. In a spray gun, means defining a cavity, an air inlet port in said cavity defining means, an air inlet passage leading to said air inlet port, air distributor means in said cavity defining means, spring means urging said air distributor means against said air inlet port, a pair of liquid inlet ports spaced from said air inlet port in said cavity defining means, a liquid inlet passage leading to each of said liquid inlet ports, a liquid valve in each said liquid inlet passage seating at a said liquid inlet port, and a shallow groove in said cavity defining means extending from said air inlet port to each of said liquid inlet ports.

7. In a spray gun, means defining a cavity, an air inlet port in said cavity defining means, an air inlet passage leading to said air inlet port, air distributor means in said cavity defining means adjacent to said air inlet port for causing air to flow along said cavity defining means, at least one liquid inlet port spaced from said air inlet port in said cavity defining means, a liquid inlet passage leading to said liquid inlet port, a liquid valve in said liquid inlet passage seating at said liquid inlet port, and a shallow groove in said cavity defining means extending from said air inlet port to said liquid inlet port.

8. In a spray gun, means defining a cavity, an air inlet port in said cavity defining means, an air inlet passage leading to said air inlet port, air distributor means in said cavity defining means adjacent to said air inlet port for causing air to flow along at least part of said cavity defining means, at least one liquid inlet port located at said part of said cavity defining means, and a liquid inlet passage leading to said liquid inlet port.

9. The structure of claim 8, and a shallow groove in said cavity defining means extending from said air inlet port to said liquid inlet port.

10. The structure of claim 8, and means for guiding air to said liquid inlet port from said air inlet port.

11. In a spray gun as set forth in Claim 8, and valve means cooperating with said liquid inlet port for controlling flow through said liquid inlet port.

12. In a spray gun, means defining a cavity, an air inlet port in said cavity defining means, an air inlet passage leading to said air inlet port, air distributor means in said cavity defining means adjacent to said air inlet port for causing air to flow along at least part of said cavity defining means, at least one liquid inlet port located at said part of said cavity defining means, and a liquid inlet passage leading to said liquid inlet port, a nozzle having a nozzle passage therethrough and a chamber adjacent the inlet end of said passage having an opening adjacent the passage inlet end, means communicating said chamber and said passage substantially at the inlet end of said passage, said nozzle passage inlet end and said chamber being in confronting relation to said cavity defining means and forming a mixing chamber therewith.

13. The apparatus of claim 12, said nozzle passage being substantially in line with said air inlet port.

14. The apparatus of claim 12, said chamber and nozzle passage inlet end together defining an additional cavity approximately equal in span to said cavity defining means.

15. In a spray gun, an air control valve having a stem, a valve head on said stem, means for supplying air to said valve head, a mixing chamber, air passage means communicating said air control valve with said mixing chamber, a liquid control valve, liquid passage means communicating said liquid control valve with said mixing chamber, pressure responsive means for actuating said liquid control valve, air passage means communicating said air control valve with said pressure responsive means, a branch channel venting said last mentioned air passage means, and valve means for closing said branch channel subsequent to the opening of said air control valve.

16. The subject matter of claim 15, said valve means being carried by said stem.

17. The subject matter of claim 15, said valve means comprising an O-ring carried by said stem.

18. In a spray gun, a mixing chamber, a liquid passage communicating with said mixing chamber, an air passage communicating with said mixing chamber, a liquid valve for controlling the flow of liquid to said mixing chamber, air pressure responsive means for actuating said liquid valve, control air passage means communicating said air passage with said air pressure responsive means, and air control valve means for selectively and sequentially occupying positions closing said air passage, supplying air only to said mixing chamber or supplying air simultaneously to said mixing chamber and said control air passage means, said air control valve means having a single movable element.

19. In a spray gun, a mixing chamber, a liquid passage communicating with said mixing chamber, an air passage communicating with said mixing chamber, a liquid valve for controlling the flow of liquid to said mixing chamber, air pressure responsive means for actuating said liquid valve, control air passage means communicating said air passage with said air pressure responsive means, and air control valve means for selectively and sequentially occupying positions closing said air passage, supplying air only to said mixing chamber, supplying air simultaneously to said mixing chamber and said control air passage means, to said mixing chamber only and for closing said air passage, said air control valve means having a single movable element.

20. The apparatus of claim 19, and trigger means for selectively holding said air control valve in any of said positions in said sequence.

21. The apparatus of claim 20, said air control valve means comprising a valve having a stem and a vent passage adjacent thereto, resilient valve means carried by said stem for closing said vent passage in a said position of said air control valve means, said trigger means comprising a pivoted trigger engageable with said stem, and pivoted holding means for said trigger including an arctuate slot eccentric relative to the center of rotation thereof.

22. The apparatus of claim 19, and means in said mixing chamber for directing air supplied thereto from said air passage means across liquid inlet port means to said chamber communicating with said liquid passage.

23. In a spray gun, a mixing chamber, a liquid passage communicating with said mixing chamber, an air passage communicating with said mixing chamber, a liquid valve for controlling the flow of liquid to said mixing chamber, air pressure responsive means for actuating said liquid valve, control air passage means communicating said air passage with said air pressure responsive means, air control valve means for selectively and sequentially occupying positions closing said air passage, supplying air only to said mixing chamber, supplying air simultaneously to said mixing chamber and said control air passage means, supplying air to said mixing chamber only and for closing said air passage, trigger means for selectively holding said air control valve in any of said positions in said sequence, said air control valve means comprising a valve having a stem and a vent passage adjacent thereto, resilient valve means carried by said stem for closing said vent passage in a said position of said air control valve means, said trigger means comprising a pivoted trigger engageable with said stem, and pivoted holding means for said trigger including an arcuate slot eccentric to the center of rotation thereof.

24. A spray gun for foam or the like comprising a body, chamber means in said body, means for supplying air and liquid to said chamber means, a longitudinally extending nozzle having a flange at the inlet end thereof seated on said body in surrounding relation to said chamber means, a nozzle passage communicating with said chamber means, and means for securing said nozzle to said body comprising a first link pivoted to said body having a collar thereon, a second link pivoted to an end of said first link, and a third link pivoted to said second link, said third link including a handle and a latch, a catch on said body engageable by said latch, a coil spring engaging said collar and a second collar engaging to said spring, said collars and springs being concentric with said second collar engaging said flange of said nozzle and holding said nozzle against said body.

25. The apparatus of claim 24, said catch and latch being over-center relative to the pivots of said second link.

26. The apparatus of claim 24, and means for holding said spring and collars in assembled relationship.

27. The apparatus of claim 24, and means in said nozzle defining a mixing chamber for fluid with said chamber means.

28. A spray gun for foam or the like comprising a body, means for supplying fluid to port means in said body, nozzle means having a passage therethrough positioned against said body with the inlet of said passage in communication with said port means, and means for securing said nozzle to said body comprising link means pivoted to said body having a collar thereon, said link means including a latch, a catch on said body engageable by said latch, a coil spring engaging said collar and a second collar engaging said spring, said collars and springs being concentric with said second collar engaging said nozzle and holding said nozzle against said body.

29. A spray gun for foam or the like comprising a body, means defining a part spherical cavity in said body, means for supplying fluid to port means in said cavity, nozzle means having a passage therethrough positioned against said body with the inlet of said passage in communication with said port means, said nozzle means having a cylindrical chamber adjacent the inlet end of said passage and said chamber and nozzle passage inlet end together defining a cavity approximately equal in span to said part spherical cavity and in confronting relationship thereto, and means for securing said nozzle to said body comprising articulated means pivoted to said body, and spring means carried by said articulated means and engaging said nozzle and urging said nozzle against said body.

30. A spray gun for foam or the like comprising a body, means for supplying fluid to port means in said body, link means pivoted to said body, a nozzle carried by said link means, locking means for releasably securing said link means in a position in which said nozzle abuts said body at said port means, and spring means carried by said link means for resiliently urging said nozzle against said body when said locking means secures said link means.

References Cited

UNITED STATES PATENTS

| | | | |
|---|---|---|---|
| 951,346 | 3/1910 | Stevens | 239—589 |
| 1,075,960 | 10/1913 | Baldwin | 239—589 |
| 1,342,486 | 6/1920 | Wolfard | 239—506 X |
| 1,549,629 | 8/1925 | Terpeney | 239—413 |
| 1,603,902 | 10/1926 | Burdick | 239—412 |
| 1,713,260 | 5/1929 | Chandler | 239—413 |
| 1,879,363 | 9/1932 | Loepsinger | 239—118 |
| 2,089,907 | 8/1937 | Lyons | 222—570 |
| 2,266,365 | 12/1941 | Harrison et al. | 239—415 X |
| 2,356,865 | 8/1944 | Mason | 239—414 |
| 2,550,888 | 5/1951 | Traughber | 239—414 X |
| 2,564,896 | 8/1951 | Gustafsson et al. | 239—412 |
| 2,589,630 | 3/1952 | Samaras | 251—12 |
| 2,991,015 | 7/1961 | Standlick | 239—415 X |
| 3,146,950 | 9/1964 | Lancaster | 239—415 X |
| 3,179,341 | 4/1965 | Plos et al. | 239—414 |
| 3,201,048 | 8/1965 | Gibbs | 239—412 X |
| 3,208,715 | 9/1965 | Noland | 251—12 |
| 3,240,432 | 3/1966 | Boettler | 239—415 X |
| 1,398,276 | 11/1921 | Phelps | 285—312 |
| 1,936,868 | 11/1933 | Whitney | 285—311 X |
| 2,144,834 | 1/1939 | Di Cesare | 285—320 |

M. HENSON WOOD, JR., *Primary Examiner.*

V. C. WILKS, *Assistant Examiner.*